United States Patent [19]

Fenton et al.

[11] Patent Number: 4,745,861
[45] Date of Patent: May 24, 1988

[54] MISSILES

[75] Inventors: George H. A. Fenton; Alfred E. Dransfield, both of Stevenage, United Kingdom

[73] Assignee: British Aerospace PLC, London, England

[21] Appl. No.: 925,235

[22] Filed: Oct. 31, 1986

[30] Foreign Application Priority Data

Oct. 31, 1985 [GB] United Kingdom ............... 8526846

[51] Int. Cl.⁴ .............................................. F42B 15/10
[52] U.S. Cl. .................................. 102/377; 244/3.23; 244/3.22
[58] Field of Search ...................... 102/377, 378, 374; 244/3.23, 3.24, 3.25, 3.3, 3.22

[56] References Cited

U.S. PATENT DOCUMENTS

| 2,968,245 | 1/1961 | Sutton et al. | 244/3.23 |
| 3,167,016 | 1/1965 | Czerwinski et al. | 102/377 |
| 3,491,692 | 1/1970 | Blankenagel | 102/377 |
| 4,625,649 | 12/1986 | Russell | 102/377 |

FOREIGN PATENT DOCUMENTS 1298369 7/1966 Fed. Rep. of Germany ...... 102/377

Primary Examiner—Deborah L. Kyle
Assistant Examiner—Michael J. Carone
Attorney, Agent, or Firm—Cushman, Darby & Cushman

[57] ABSTRACT

An annular expulsion motor (14) is secured around the main nozzle casing (12) of a missile by means of shear bolts (28). The expulsion motor expels and spins up the missile prior to ignition of the missile main motor whereupon the expulsion motor is jettisoned from the missile by the efflux of the main motor.

4 Claims, 1 Drawing Sheet

MISSILES

BACKGROUND OF THE INVENTION

This invention relates to an expulsion motor for a missile and to self-propelled missiles incorporating an expulsion motor.

In many applications it is desirable to use a missile system in which the missile is initially launched from a launch tube by means of an expulsion motor prior to ignition of the missile main motor. For example when the missile is to be launched from a shoulder launcher it is necessary to ensure that the missile has been expelled from the container a safe distance away from the operator prior to ignition of the boost motor to avoid injury to the operator or damage to the equipment associated with the missile. A similar need may arise for helicopter launched missiles.

In a conventional form of expulsion motor propulsive charges are located directly behind the missile but this arrangement means that a longer container launch tube is required for the missile. Other arrangements make use of a cannister attached to the missile and containing a propulsive charge. However, particularly where the missile is to be accelerated to very high speeds by the boost motor, the mass associated with the empty cannister constitutes dead weight which must be accelerated together with the missile itself and consequently the velocity of the missile is reduced.

SUMMARY OF THE INVENTION

According to one aspect of this invention, there is provided a missile including a main body, propulsion means contained within said body and adapted to exhaust a flow of propulsive efflux rearwardly, an expulsion motor of generally annular cross-section surrounding at least part of the rearward body portion of the missile and including a propellant charge and expulsion motor outlet means for exhausting efflux generated by said charge, said expulsion motor being releasably attached to said missile by means which allows transmission of propulsive thrust from the expulsion motor to the missile but which on actuation of said propulsion means allows separation of said expulsion motor from said missile body.

By this arrangement it will be appreciated that the expulsion motor may be fitted around the missile main body structure, thus not contributing significantly to the axial length of the missile. Also, the expulsion motor may be detached prior to ignition of the missile propulsion means so that energy is not used up in imparting further acceleration to the expended expulsion motor casing.

Preferably, said expulsion motor outlet means is adapted to cause fluid exhausting therefrom to have a tangential component of thrust thereby to impart to said missile a spin torque together with a forward thrust.

Preferably, said expulsion motor includes obturator means disposed adjacent the rear end portion of said missile arranged such that said propulsive efflux impinges thereon and imparts sufficient rearward thrust on the expulsion motor to cause separation.

According to another aspect of this invention, there is provided an expulsion motor for a missile, comprising a housing of generally annular cross-section, a propellant charge contained within said housing, expulsion motor outlet means for exhausting efflux generated by said charge, and means for releasably attaching said expulsion motor to a missile.

BRIEF DESCRIPTION OF THE DRAWINGS

Further aspects will become apparent from the following description, which is by way of example only, reference being made to the accompanying drawings in which.

DETAILED DESCRIPTION

Figure 1:
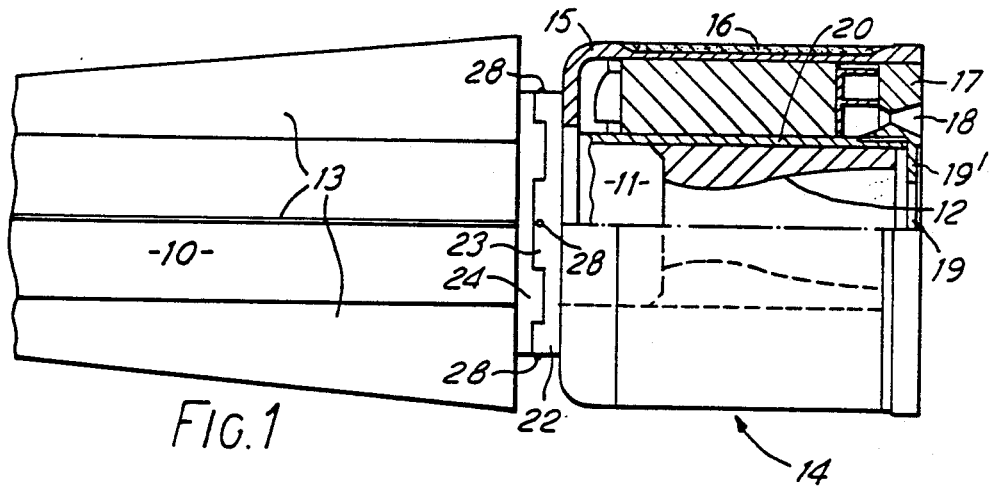
FIG. 1 is a part-sectioned side view of the rearward portion of a missile showing the location of an expulsion motor.
Figure 3:
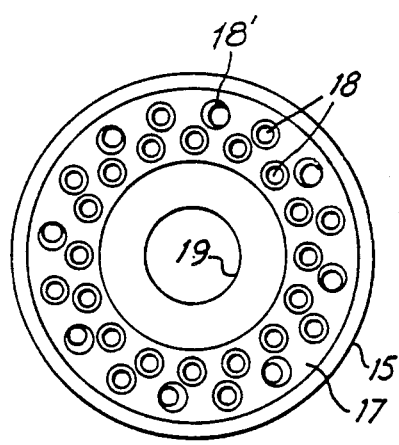
FIG. 3 is a rear end view of the expulsion motor of FIGS. 1 and 2.
Figure 4:
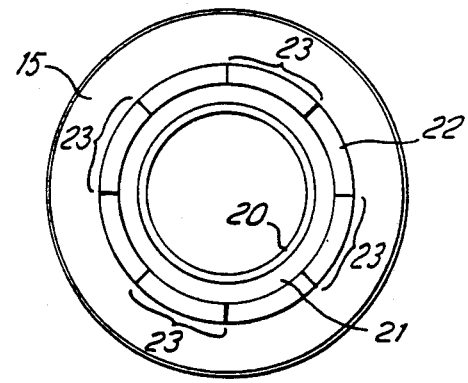
FIG. 4 is a front end view of the expulsion motor.

The arrangement illustrated in the drawings is intended for expelling a high velocity missile from its launch container a sufficient distance from the launcher to allow its boost motor to be ignited safely, and for imparting spin to the missile to assist in stabilising the missile. Referring initially to FIG. 1, there is shown the rear end of a missile. The missile includes a body portion 10 of generally cylindrical form housing at its rear end the main motor 11 of the missile and the main motor nozzle 12. Four fins 13 project transversely of the body and terminate a short distance away from the end of the missile. An expulsion motor assembly 14 of generally annular cross-section is located rearwardly of the fins and surrounds the end of the missile body. The assembly 14 comprises an outer tube 15 of high strength aluminium alloy overwrapped with Kevlar fibre 16 to resist hoop loads. The rear end of the outer tube 15 is locally thickened and internally threaded to receive an externally threaded nozzle plate 17 (see FIG. 3) also of high strength aluminium alloy and which has two series of sixteen nozzle holes 18 on two pitch circle diameters. Alternate nozzles 18' on the outer pitch circle diameter are canted to impart a clockwise spin to the missile as viewed from the rear. The throats of the nozzle holes 18 may be treated or fitted with metal inserts to resist erosion. The nozzle plate 17 also includes a central aperture 19 having an annular lip 19' which protrudes into the efflux of the main missile motor 11 when ignited. The aperture 19 is internally threaded to receive the externally threaded rear end of the inner hollow cylindrical tube 20 of the expulsion motor.

Figure 2:
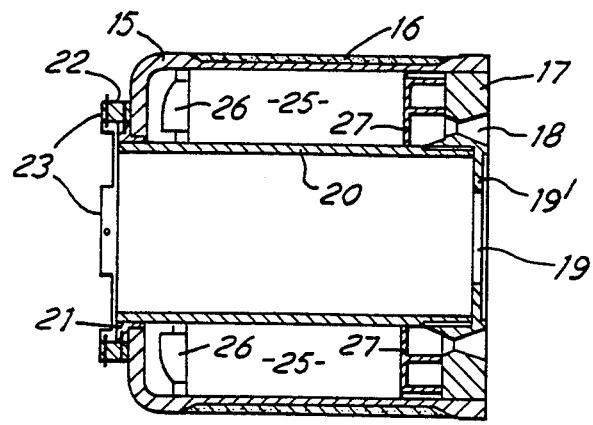
FIG. 2 is a detailed longitudinal section view on the motor.

Referring now in particular to FIG. 2, the forward end of the inner tube 20 passes through an aperture in the front end of the outer tube 15 and is externally threaded to engage an internally threaded locking ring 21 which locks the inner tube 20 to the outer tube 15 which is bottled over as shown. An annular collar 22 is secured to the outside of the locking ring by screws passing through the collar 22 into the locking ring. The forward surface of the collar 22 is castellated to provide four lugs 23. The missile is provided with a complementarily castellated collar 24 so that the torque induced by the canted nozzles 18' may be transferred from the expulsion motor casing to the missile body.

The expulsion motor includes a propellant charge 25 and associated igniter 26 located between the inner and outer tubes and spaced from the nozzle plate by a spacer 27. During assembly the expulsion motor is slid over the end portion of the missile body and the complementary castellated collars 23 and 24 are engaged. The castellated collar of the expulsion motor is releasably attached to the missile body by means of four nylon shear screws 28 each passing through a lug 23 into the missile body.

At launch, the propellant charge within the expulsion motor is ignited thus imparting both a forward thrust and a clockwise torque to the missile. The forward thrust and the torque are transmitted from the expulsion motor to the missile via the complementary castellated collars. After a predetermined delay, ignition of the main motor 11 occurs and the efflux generated thereby impinges on the annular collar 19 of the nozzle plate 17 thus applying a load which tends to drive the expulsion motor rearwardly with respect to the missile. The nylon shear screws 28 then break and the expulsion motor is jettisoned, with little or no forward velocity.

In this arrangement, the expulsion motor surrounds a part of the missile body; thus it does not increase the length of the launch container required. In addition, the motor is of similar outside diameter to the fins and thus does not require a larger diameter container.

The dead mass of the exhausted expulsion motor is jettisoned instantaneously with or shortly after ignition of the boost motor. Thus no thrust developed by the boost motor is expended in accelerating the exhausted expulsion motor.

We claim:

1. An expulsion motor for fitting over the aft body portion of a missile which includes a main body portion and an aft body portion housing propulsion efflux outlet means, said expulsion motor comprising:
    inner and outer generally cylindrical wall portions together defining a generally annular chamber for an expulsion charge, said inner wall portion defining a bore into a major part of which the aft body portion of the missile extends in use;
    an end wall portion defining an outlet for expulsion efflux including means for deflecting said efflux to thereby impart a spin torque to said expulsion motor;
    an obturator rib projecting partially radially inwardly adjacent the propulsion motor efflux outlet means when said motor is fitted to the missile, whereby in use efflux exhausting from said outlet means impinges upon said obturator rib;
    torque transfer means for transferring the spin torque to the missile; and
    means for releasably attaching said expulsion motor to the aft body portion of the missile for longitudinal separation therebetween on application of a separation force developed by impingement of propulsion efflux of the missile on said rib.

2. A missile comprising:
    a main body portion housing a propulsion motor;
    an aft body portion housing a propulsion motor efflux outlet;
    an expulsion motor fitting over said aft body portion and including inner and outer generally cylindrical wall portions together defining a generally annular chamber for an expulsion charge, an end wall portion defining an outlet for expulsion efflux including means for deflecting said efflux to thereby impart a spin torque to said expulsion motor, the inner wall portion of the expulsion motor fitting over the aft body portion so that said aft body portion extends into a major part of the generally cylindrical bore defined by said inner wall portion, said expulsion motor further including an obturator rib projecting partially radially inwardly adjacent said propulsion motor efflux outlet, whereby efflux exhausting from said outlet impinges upon said obturator rib;
    complementary engagement means provided on said aft body portion and said expulsion motor for transferring spin torque from said expulsion motor to said aft body portion but allowing relative longitudinal separation therebetween; and
    means releasably connecting said motor to said aft body portion for longitudinal separation therebetween on application of a predetermined separation force thereto, whereby on ignition of said propulsion motor following launch of said missile, the impingement of propulsion efflux on said obturator rib effects the separation force and causes said expulsion motor to separate from said missile with reduced forward velocity.

3. A missile as claimed in claim 2, wherein said expulsion motor is releasably attached to said missile by means of frangible connection 4. A missile as claimed in claim 2, wherein said expulsion motor includes a castellated collar portion adapted to engage a complementary castellated portion on said missile.

* * * * *